(12) United States Patent
Yin et al.

(10) Patent No.: US 8,763,154 B2
(45) Date of Patent: Jun. 24, 2014

(54) FEDERATED AUTHENTICATION

(75) Inventors: Fenglin Yin, Lexington, MA (US); Jack Jianxiu Hao, Lexington, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 219 days.

(21) Appl. No.: 13/355,909

(22) Filed: Jan. 23, 2012

(65) Prior Publication Data

US 2013/0191929 A1 Jul. 25, 2013

(51) Int. Cl.
*G06F 7/04* (2006.01)

(52) U.S. Cl.
USPC .............................. 726/28; 713/168; 713/171

(58) Field of Classification Search
None
See application file for complete search history.

(56) References Cited

U.S. PATENT DOCUMENTS

| 2002/0066033 | A1* | 5/2002 | Dobbins et al. | 713/201 |
| 2005/0278259 | A1* | 12/2005 | Gunaseelan et al. | 705/59 |
| 2010/0115612 | A1* | 5/2010 | O'Brien et al. | 726/22 |

\* cited by examiner

*Primary Examiner* — Kaveh Abrishamkar

(57) ABSTRACT

A system may receive, at a site, a first message for authentication from a browser hosted on a user device; send, from the site, a redirect universal resource locator of a partner system to the browser; receive a response from the partner system via the browser, the response including a second message indicating whether an authentication of a user of a first device, at the partner system, was successful; determine whether the authentication has been successful based on the second message; and register the first device when it is determined that the authentication has been successful based on the second message.

21 Claims, 13 Drawing Sheets

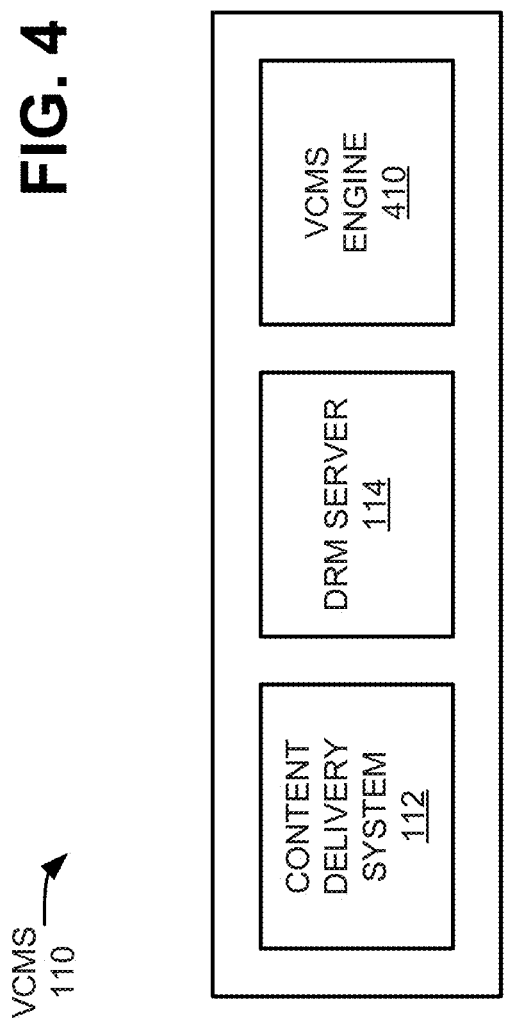

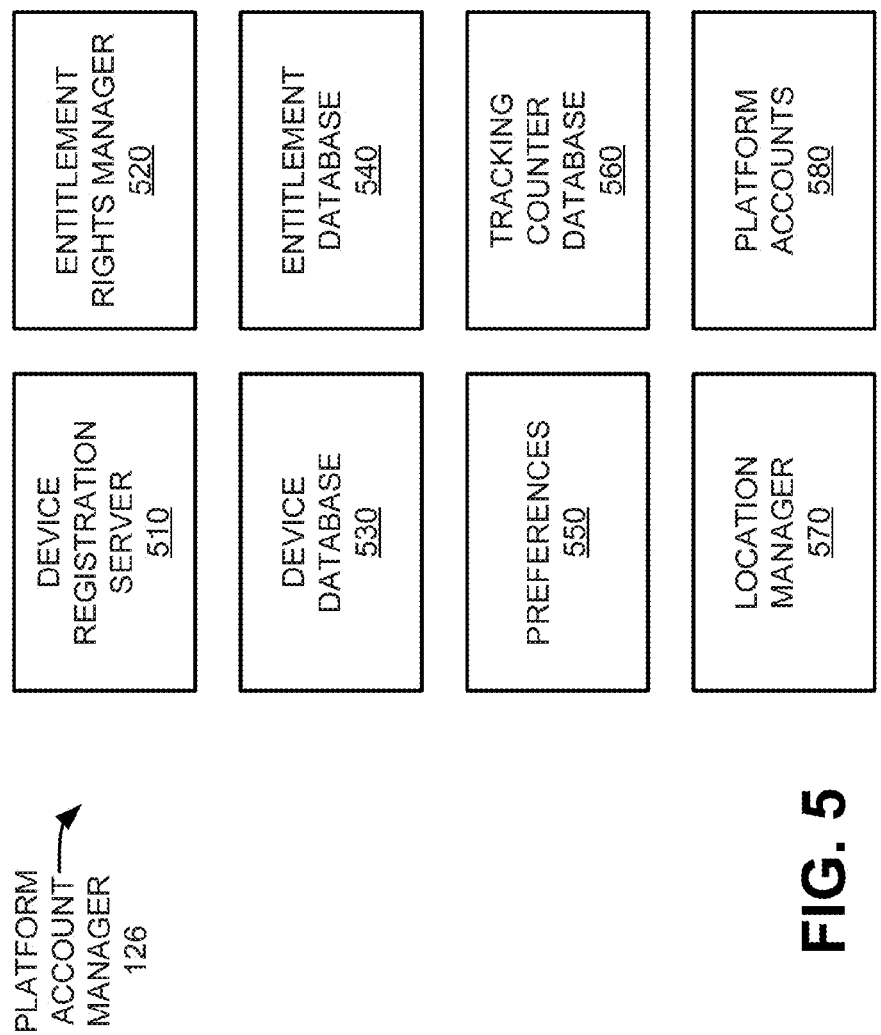

FEDERATED AUTHENTICATION

BACKGROUND

Multi-screen video architecture generally provides cross-platform access to a single content source. Among other benefits, multi-screen video provides consumers with the possibility to watch video on a screen/device of their choice. For example, a live broadcast television event may be available for viewing on various types of mobile devices.

BRIEF DESCRIPTION OF THE DRAWINGS

FIG. 4 is a block diagram of exemplary functional components of the video content management system (VCMS) of FIG. 1;

FIG. 5 is a block diagram of exemplary functional components of the platform account manager of FIG. 1;

DETAILED DESCRIPTION OF PREFERRED EMBODIMENTS

The following detailed description refers to the accompanying drawings. The same reference numbers in different drawings may identify the same or similar elements.

As described herein, a system performs federated/cooperative/collaborative authentication, Before a user can receive a content stream from the system via a user device, the user needs to register the user device, When a user registers a user device at the system via a browser installed on the user device, a platform account manager of the system initiates a federated/cooperative authentication by redirecting the browser to a partner system. The partner system then authenticates the user, and redirects the browser to the platform account manager, sending a message to the platform account manager to indicate a result of the authentication. The platform account manager completes the federated authentication by verifying the message. If the message is successfully verified, the platform account manager allows the user to proceed with the registration. Once the user device is registered, the user may request user-selected content from the system to be streamed to the registered user device.

Figure 1:
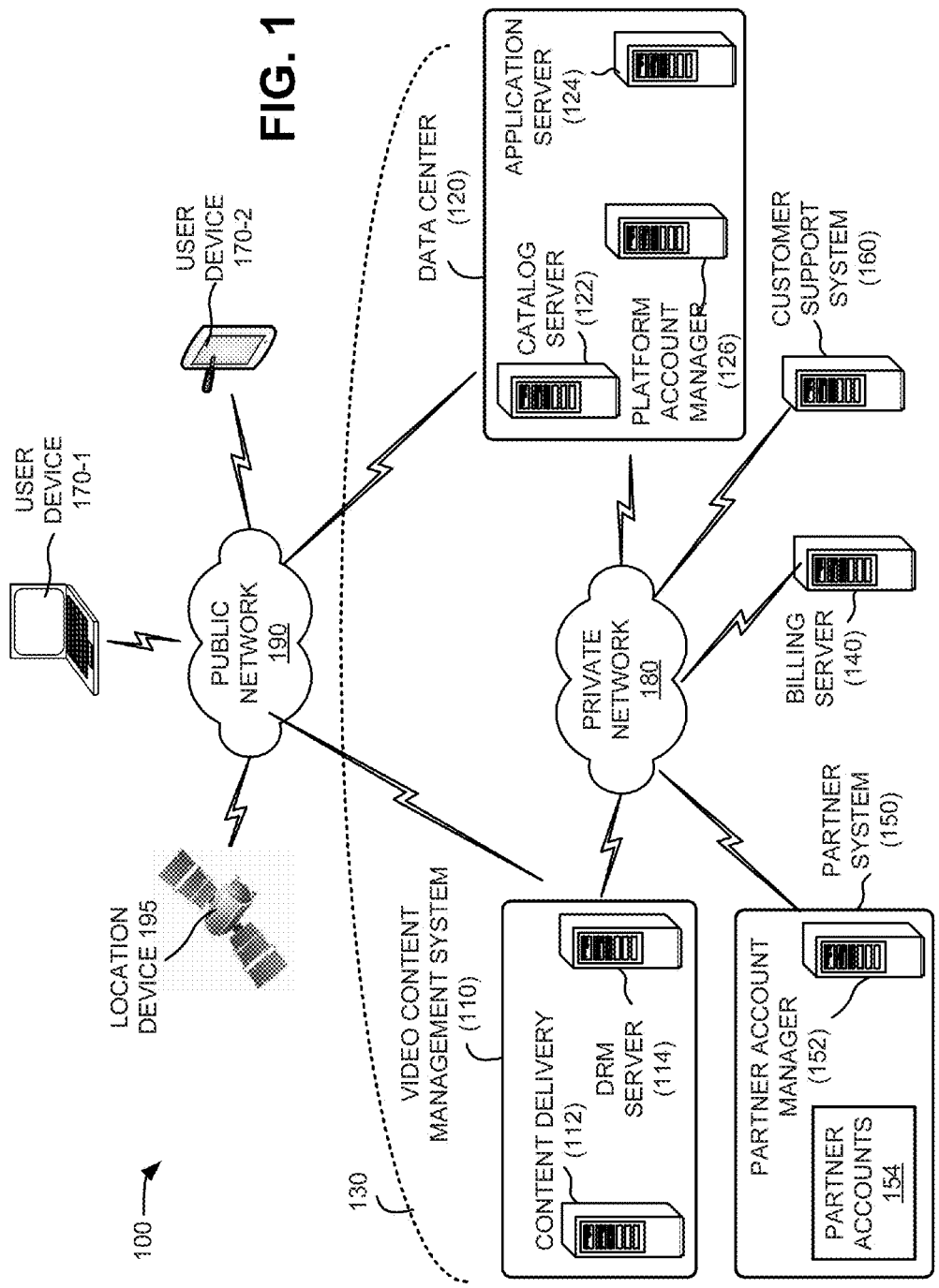
FIG. 1 is an exemplary network in which systems and/or methods described herein may be implemented.

FIG. 1 is an exemplary network 100 in which systems and/or methods described herein may be implemented. As illustrated, network 100 may include user devices 170-1 and 170-2 (collectively "user devices" and individually "user device 170"), public network 190, system 130, and location device(s) 195. As further shown, system 130 may include a video content management system (VCMS) 110, a data center 120, a billing server 140, a partner system 150, a customer support system 160, and a private network 180.

VCMS 110 may aggregate content and content metadata, process content, and distribute content. For example, VCMS 110 may receive, capture, and encrypt video streams of online live TV programs and tag each capture with an identifier, channel identifier, program identifier, airing time, etc. In another example, VCMS 110 may transcode content into a digital format suitable for consumption on particular user device 170. In some implementations, VCMS 110 may include a transcoder (hardware or software) to convert a video file from one format to another (e.g., from one bit rate to another bit rate, from one resolution to another, from one standard to another, from one file size to another, etc).

As further shown in FIG. 1, VCMS 110 may include a content delivery system 112 and a digital rights management (DRM) server 114. Content delivery system 112 may deliver digital content from a backend server to user device 170 via, for example, a content delivery network (CDN). In one implementation, content delivery system 112 may include a server that provides streaming data (e.g., via, a streaming universal resource locator (URL)) to user devices 170 (e.g., via public network 190). in one implementation, a streaming URL can be used only once for one user device 170 for security purposes.

DRM server 114 may issue DRM licenses to a client, such as an application running on one of user devices 170. In some implementations, DRM server 114 may determine entitlement rights and/or other authorization parameters via interfaces of data center 120. Such information may be used to authorize a user to access particular content (e.g., issue a license to user device 170).

Data center 120 may manage user authentication, authorization for playing content, selection of content, and/or purchase of content by a user of user devices 170. As shown in FIG. 1, data center 120 may include a catalog server 122, an application server 124, and a platform account manager 126. In one implementation, data center 120 may be accessed by user devices 170 via public network 190.

Catalog server 122 may provide a unified catalog of both digital and physical content for users (e.g., of user devices 170) to consume (e.g., buy, rent, or subscribe). In one implementation, catalog server 122 may collect and/or present listings of content available to user device 170. For example, catalog server 122 may receive digital and/or physical content metadata, such as lists or categories of content, from VCMS 110 and/or partner system 150. Catalog server 122 may use the content metadata to provide currently-available content options to user device 170. Catalog server 122 may provide the content metadata to user device 170 directly or may communicate with user device 170 via application server 124.

Application server 124 may provide a backend support system for applications residing on user devices 170. For example, application server 124 may authenticate (e.g., via platform account manager 126 and/or partner system 150) a user who desires to purchase, rent, or subscribe to digital or physical content. In another example, application server 124 may permit user device 170 to download a video application that enables a user to find content of interest or play downloaded or streaming content. In some implementations, the downloaded video application may participate in registration of user device 170 a VCMS 110.

Once user device 170 is registered at/via data center 120, the downloaded video application may enable user device 170 to present to a user of user device 170 information received from data center 120 in an interactive format, to allow selection of particular digital or physical content. Furthermore, the video application may coordinate with VCMS 110 and data center 120 in authorizing user device 170 to access the selected content.

Application server 124 may also provide content metadata, such as lists or categories of content, to user device 170. In one implementation, the interactions between application server 124 and user device 170 may be performed using hypertext transfer protocol (HTTP) or secure HTTP (HTTPS) via public network 190.

Platform account manager 126 may receive a login request associated with a user via another component in system 130 (e.g., application server 124, VCMS 110, etc.), and may initiate a login process. In one implementation, platform account manager 126 may participate in a federated/cooperative authentication process that involves partner system 150. Additionally, or alternatively, platform account manager 126 may request/receive device information (e.g., a registration token) associated with user device 170 via VCMS 110, and may compare the device information with stored information to validate/authenticate user device 170. Depending on the implementation, the stored information may reside in catalog server 122, platform account manager 126, etc.

Platform account manager 126 may also store or access, on behalf of another component (e.g., VCMS 110), information that is associated with enforcing entitlement rights of a user of user device 170. The information may include or identify, for example, blackout times, blackout regions, entitlement rights, a device tracking counter (to be described below), total viewing session counter, etc. The information may be stored in data center 120.

Platform account manager 126 may also store or retrieve account information (also referred to as "profiles") of users (e.g., users of user devices 170). The account information/ user profiles may include various information regarding a user. Application server 124 may use account information/ profile via platform account manager 126 and may update the account information/user profile, via platform account manager 126, based on the user's activity (e.g., with a user's express permission).

In some implementations, account information/a user profile in platform account manager 126 may include information used to determine user entitlements, which in turn are used to issue a license key for user-selected content. For example, a profile may include a device registration token, the maximum number of concurrent viewing sessions for the user, the maximum number of total viewing sessions for the user, video quality right, user device identifiers (e.g., a media player identifier, a mobile device identifier, a set top box identifier, a personal computer identifier) for user devices 170 associated with the user.

Billing server 140 may manage charging users for services provided via system 130. Billing server 140 may include, for example, a payment processing component, a billing component, and/or a settlement component.

Partner system 150 may include a partner account manager 152 and partner accounts 154. Partner account manager 152 may coordinate with other components of system 130 to provide federated/collaborative authentication. Partner accounts 154 may include account information/user profiles, such as user contact information, billing information, login credentials (e.g., a user ID and a password), billing history, etc. Depending on the implementation, the information included in partner system 150 may or may not overlap with information in platform account manager 126 or data center 120.

Depending on the implementation, partner system 150 may also track physical content (e.g., DVDs, Blu-ray discs, memory cards, etc.) and provide metadata of physical content for inclusion in catalog information provided to users of user devices 170. In implementations described herein, partner system 150 may be controlled by a different entity a. third-party provider) than the entity controlling VCMS 110, data center 120, and/or other components of system 130.

Customer support system 160 may solicit and/or receive user feedback, questions, or credit-related requests. In one implementation, customer support system 160 may include interfaces for accessing data center 120 and/or billing server 140, for example, to receive problem reports and to resolve customer billing disputes.

User device 170 may include a computational or communication device. User device 170 may enable a user to view video content or interact with another user device 170 or a video display device (e.g., a set-top box and/or television). User device 170 may include, for example, a personal communications system (PCS) terminal (e.g., a smartphone that may combine a cellular radiotelephone with data. processing and data communications capabilities), a tablet computer, a smartphone, a personal computer, a laptop computer, a gaming console, an Internet television, or other types of computation or communication devices. In some implementations, user device 170 may include a component for identifying the geographical location of user device 170 (e.g., a Global Positioning System (GPS) receiver).

In one implementation, user device 170 may include a video application that enables user device 170 to communicate with, for example, data center 120 and/or to present information received from data center 120 to a user. The video application may permit a user of user device 170 to login to an account e.g., via application server 124, platform account manager 126, and partner system 150), access catalog information (e.g., from catalog server 122), submit an order, and/ or consume live streaming video content (e.g., from VCMS 110). The video application may also coordinate with VCMS 110 and data. center 120 in enforcing entitlement rights.

Private network 180 may include, for example, one or more private IP networks that use a private IP address space. Private network 180 may include a local area network (LAN), an intranet, a private wide area network (WAN), etc. In one implementation, private network 180 may implement one or more Virtual Private Networks (VPNs) for providing communication between, for example, any of VCMS 110, data center 120, billing server 140, partner system 150, and/or customer support system 160. Private network 180 may be protected/ separated from other networks, such as public network 190, by a firewall. Although shown as a single element in FIG. 1, private network 180 may include a number of separate networks.

Public network 190 may include a local area network (LAN), an intranet, Internet, a wide area network (WAN), such as a cellular network, a satellite network, a fiber optic network, a private WAN, or a combination of the Internet and a private WAN, etc. that is used to transport data. Although shown as a single element in FIG. 1, public network 190 may include a number of separate networks that function to provide services to user devices 170.

Location devices 195 may provide signals from which a device (e.g., user device 170) may determine the location of the device. Examples of location devices 195 may include cellular transmission towers, global positioning system (GPS) satellites, Galileo satellite system (GSS) satellites, Beidu navigation system satellites, etc.

In FIG. 1, the particular arrangement and number of components of network 100 are illustrated for simplicity. In practice there may be more VCMSs 110, data centers 120, billing servers 140, partner systems 150, customer support systems 160, user devices 170, networks 180/190, and/or location devices 195. Components of system 100 may be connected via wired and/or wireless links.

Figure 2:
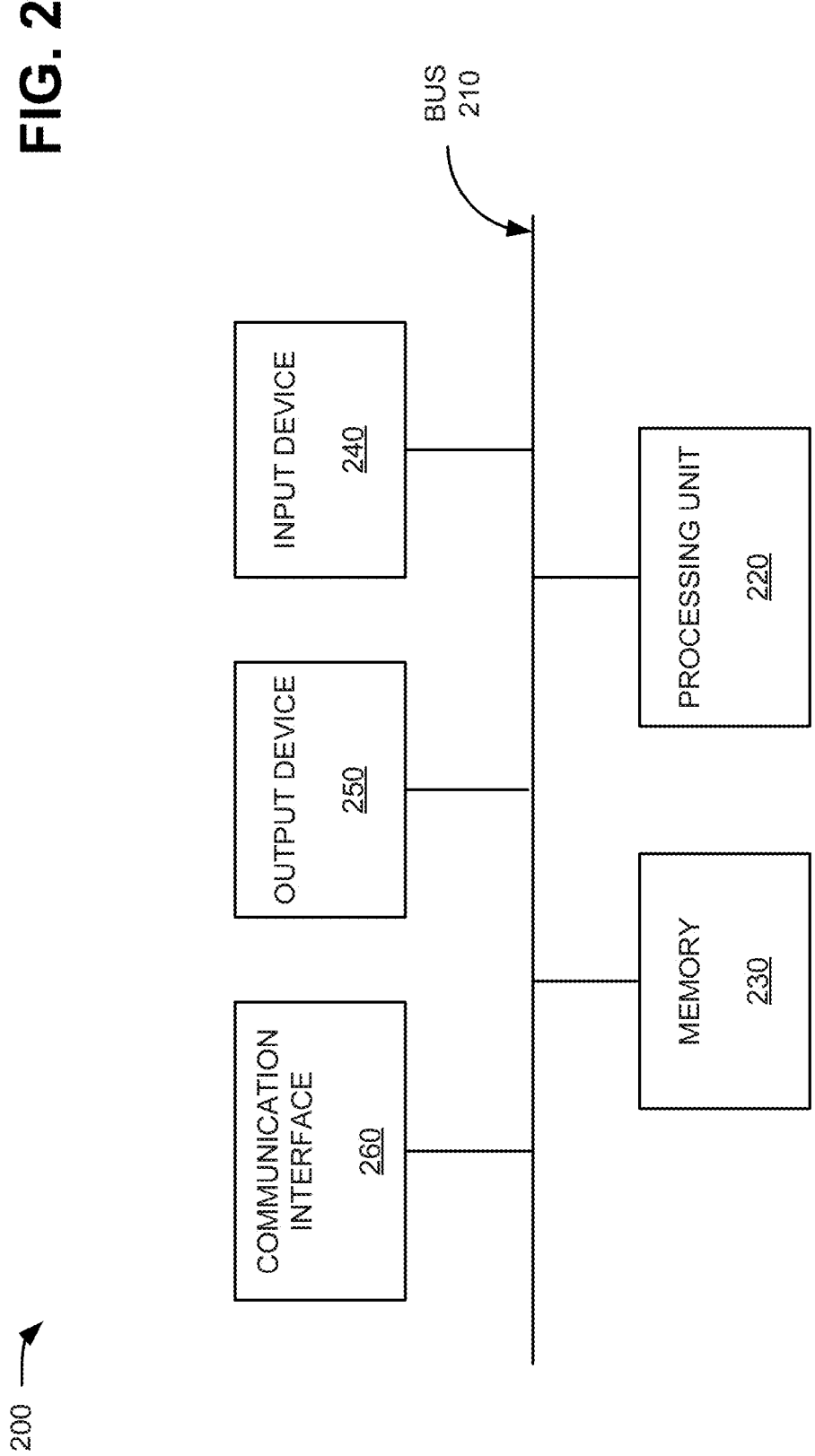
FIG. 2 is a block diagram of exemplary components of a device that may correspond to one of the devices of FIG. 1.

FIG. 2 is a diagram of exemplary components of a network device 200. Each of VCMS 110, content delivery system 112, DRM server 114, data center 120, catalog server 122, application server 124, platform account manager 126, billing server 140, partner system 150, partner account manager 152 and partner accounts :154 in partnership system 150, and customer support system 160 may be implemented/installed as software, hardware, or a combination of hardware and software, on one or more of network device 200. As shown in FIG. 2, device 200 may include a bus 210, a processing unit 220, a memory 230, an input device 240, an output device 250, and a communication interface 260.

Bus 210 may permit communication among the components of device 200. Processing unit 220 may include one or more processors or microprocessors that interpret and execute instructions. In other implementations, processing unit 220 may be implemented as or include one or more application specific integrated circuits (ASICs), field programmable gate arrays (FPGAs), or the like, Memory 230 may include a random access memory (RAM) or another type of dynamic storage device that stores information and instructions for execution by processing unit 220, a read only memory (ROM) or another type of static storage device that stores static information and instructions for the processing unit 220, and/or some other type of magnetic or optical recording medium and its corresponding drive for storing information and/or instructions.

Input device 240 may include a device that permits an operator to input information to device 200, such as a keyboard, a keypad, a mouse, a pen, a microphone, one or more biometric mechanisms, and the like, Output device 250 may include a device that outputs information to the operator, such as a display, a speaker, etc.

Communication interface 260 may include any transceiver-like mechanism that enables device 200 to communicate with other devices and/or systems. For example, communication interface 260 may include mechanisms for communicating with other devices, such as other devices of system 100.

As described herein, device 200 may perform certain operations in response to processing unit 220 executing software instructions contained in a computer-readable medium, such as memory 230. A computer-readable medium may include a non-transitory memory device. A memory device may include space within a single physical memory device or spread across multiple physical memory devices. The software instructions may be read into memory 230 from another computer-readable medium or from another device via. communication interface 260. The software instructions contained in memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows exemplary components of device 200, in other implementations, device 200 may include fewer components, different components, differently arranged components, or additional components than depicted in FIG. 2. As an example, in some implementations, a display may not be included in device 200. In these situations, device 200 may be a "headless" device that does not include an input device. Alternatively, or additionally, one or more components of device 200 may perform one or more other tasks described as being performed by one or more other components of device 200.

Figure 3:
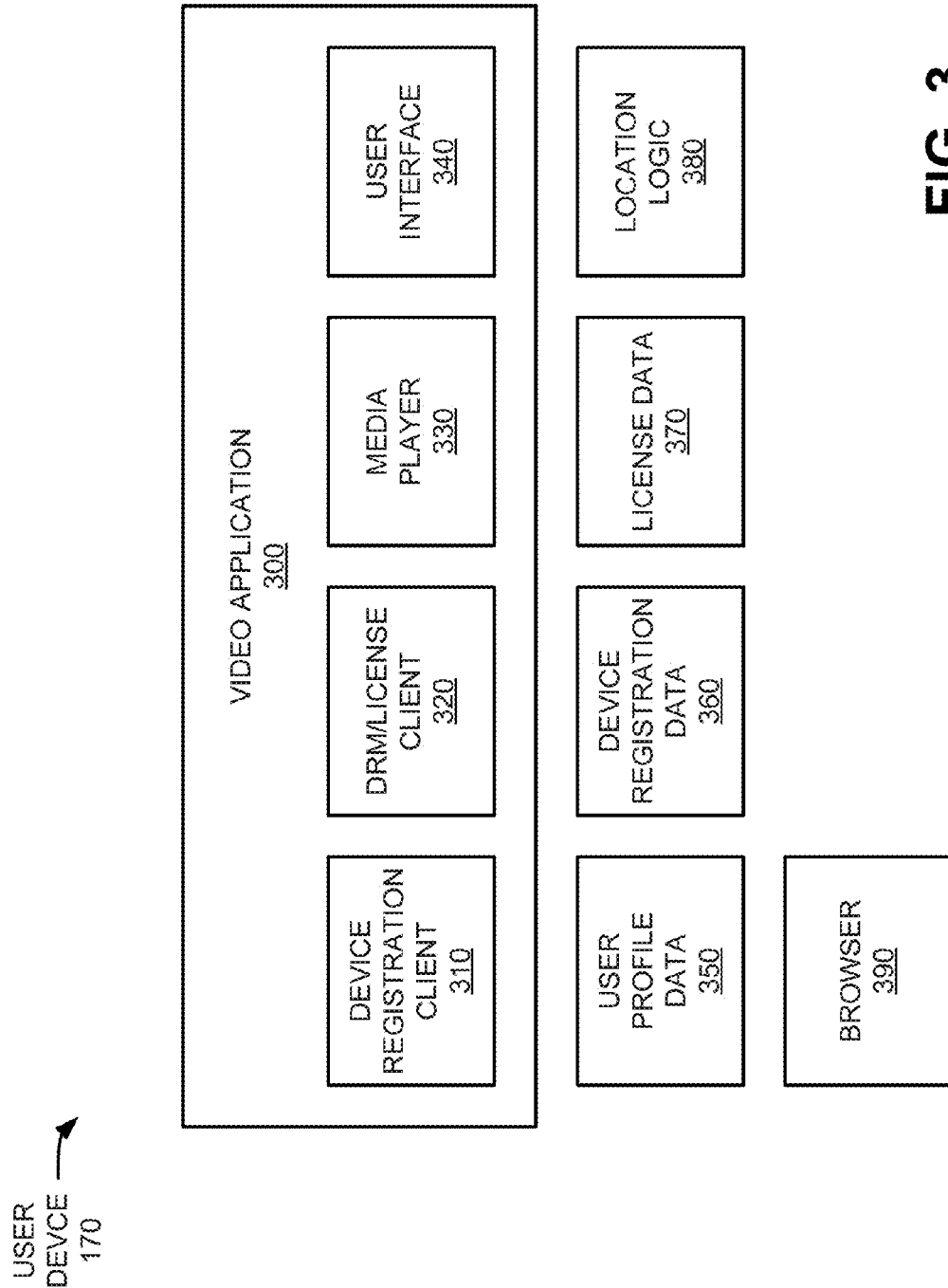
FIG. 3 is a Hock diagram of exemplary functional components of the user device of FIG. 1.

FIG. 3 is a block diagram of exemplary functional components of user device 170. The functions described in connections with FIG. 3 may be performed by one or more components of FIG. 2. As shown in FIG. 3, user device 170 may include video application 300, user profile data 350, device registration data 360, license data 370, location logic 380, and a browser 390. Depending on the implementation, user device 170 may include additional, fewer, different, or a different arrangement of devices than those illustrated in FIG. 3.

Video application 300 may include hardware and software components. The software components may be downloaded from application server 124 in data center 1120 when user device 170 contacts application server 124 to enable user device 170 to play content from/via VCMS 110, Video application 300 may coordinate with VCMS 110 and data center 120 in enforcing entitlement rights associated with the user of user device 170.

In addition, video application 300 may enable user device 170 to perform functions that are described above, such as: playing video content or interact with another user device 170 or a video display device a set-top box and/or television); communicating with, for example, data center 120 and/or presenting information received from data center 120 to a user; permitting a user of user device 170 to login to an account (e.g., via application server 124); accessing catalog information (e.g., from catalog server 122); submitting an order; and/or consuming live streaming video content (e.g., from VCMS 110).

As further shown in FIG. 3, video application 300 may include a device registration client 310, a DRM/license client 320, a media player 330, and a user interface 340. Depending on the implementation, video application 300 may include additional, fewer, different, or differently arranged components than those illustrated in FIG. 3, For example, in one implementation, video application 300 may not include media player 330, In such implementations, media player 330 may be or have been installed on user device 170 as a separate application.

Device registration client 310 may participate in registration of user device 170. For example, device registration client 310 may initiate a registration. To start a registration, device registration client 310 may send a message to VCMS 110 to determine whether user device 170 is registered (e.g., recognized by VCMS 110 as a device that can receive content from VCMS 110). The message may include an identifier, also known as a client ID or client application ID, that is associated and distributed with video application 300.

Upon receipt of the message, VCMS 110 may indicate to device registration client 310 whether user device 170 has been registered at VCMS 110, If user device 170 has not been registered at VCMS 110, VCMS 110 may send an activation code and an activation URL to device registration client 310.

In response, the user of user device 170 may manually register user device 170. The registration may entail the user accessing browser 390 at user device 170, visiting the activation URL provided by VCMS 110, authenticating the user/user device 170 at the activation URL, and upon successful authentication, inputting the activation code provided by VCMS 110. Upon successful registration, platform account manager 126 may return (e.g., via application server 124), a globally unique registration token to device registration client 310 when it contacts account manager 126. Device registration client 310 may store the registration token, the activation code, and/or the client ID as device registration data 360.

DMR/license client 320 acquires licenses for content that is selected by a user for viewing or playing at user device 170. When a user selects particular content via user interface 340, video application 300 begins to download either metadata or the video via VCMS 110. Furthermore, DMR/license client 320 sends a request for a license to VCMS 110. The request may include all or a portion of device registration data 360 (e.g., registration token). In some implementations, the request may also include location information that identifies the location of user device 170. DRM/license client 320 may have Obtained the location information from location logic 380. In other implementations, the request may include an identifier of the base station via which user device 170 has joined or accessed network 100 or an IP address of user device 170.

If DMR/license client 320 receives a license for the selected content from VCMS 110, DRM/license client 320 stores the license as license data 370, The license may include a decryption key, for example, to decrypt the particular content. The particular content may have been encrypted for copyright protection.

Media player 330 may decode and play content that is received via VCMS 110 and/or a CDN. Media player 330 may output the decoded video to output components (e.g., a display, speakers, etc.) of user device 170, User interface 340 may enable a user to request a list of available content (e.g., both digital and physical content) and select from the list of available content. User interface 340 may also include an account login interface. For example, user interface 340 may request, from data center 120, a list of content available for downloading and may present the list of content to a user of user device 170. User interface 340 may include an interactive client interface that allows a user to provide input, such as user passwords, preferences, and selections from the list of available content, In one implementation, user interface 340 may indicate a user's selection (e.g., from the catalog) to data center 120 and, in return, receive session-specific information to obtain the selected content.

User profile data 350 may include a copy of a user-specific information and session-specific information obtained from data center 120. For example, user profile data 350 may include a profile, which is also stored at platform account manager 126. As described above with reference to platform account manager 126, a profile a may include information needed for determining entitlements. For example, a profile may include/specify a device registration token, the maximum number of concurrent viewing sessions for the user, the maximum number of total viewing sessions for the user, video quality right, user device identifiers (e.g., a media player identifier, a mobile device identifier, a set top box identifier, a personal computer identifier) for user devices 170 associated with the user.

User profile data 350 may also include, for example, login information (e.g., a user identifier and a password); billing information; address information; types of services to which the user has subscribed; a list of digital/physical content purchased by the user; a list of video content rented by the user; a list of video content to which the user has subscribed; etc. User profile data 350 may also include session-specific information, such as, for example, cookies, URLs, or other information able user device 170 to access content delivery system 112 and DRM server 114.

Device registration data 360 may include, as described above, for example, information received from VCMS 110 or data center 120 during registration. For example, device registration data 360 may include the registration token, the activation code, and/or the client ID.

License data 370 may include a license key or a decryption key received from VCMS 110. When DRM/license client 320 sends a request for a license key for selected content to VCMS 110, VCMS 110 may issue a license key to DRM/license client 320. As described above, DRM/license client 320 may store the license key as license data 370. A license key may be used (e.g., by media player 330 or another component) to decrypt video content that was encrypted for copyright restriction.

Location logic 380 may determine the location of user device 170 based on signal/data from location device 195 (e.g., coordinates, an ID of the base station via which user device 170 joins network 100, IP address, etc.). Location logic 380 may output location information based on the determined location and provide the location information to another component in user device 170, such as DRM/license client 320. Depending on the implementation, when video application 300 requests a license to view/play particular content from VCMS 110, video application 300 may send the location information obtained from location logic 380 (as part of the license request) to VCMS 110.

Browser 390 may include a web browser. Browser 390 may be used to perform federated authentication via platform account manager 126 and/or partner account manager 152.

FIG. 4 is a diagram of exemplary functional components of VCMS 110. In one implementation, the functions described in connection with FIG. 4 may be performed by one or more components of device 200 (FIG. 2). As shown in FIG. 4, VCMS 110 may include content. delivery system 112, DRM server 114, and VCMS engine 410. Content delivery system 112 and DRM server 114 may inch le some features described above in connection with, for example, FIGS. 1-3.

VCMS engine 410 may receive catalog item descriptors and/or metadata (e.g., for physical assets) from partner system 150. VCMS engine 410 may also receive catalog metadata for digital content from other partner systems and content providers (not shown), VCMS engine 410 may compile catalog metadata from partner system 150 and from digital content providers and provide a unified catalog file to catalog server 122.

VCMS engine 410 may also receive and encrypt digital content (e.g., corresponding to catalog metadata) for secure distribution to user devices 170. In some instances, encryption may require an encryption key, which VCMS engine 410 may retrieve via DRM server 114. After encryption, VCMS engine 410 may provide the encrypted content to content delivery system 112.

In one implementation, VCMS engine 410 may also generate a settlement file that may be used to help billing server 140 determine settlement cost with content sources. For example, VCMS engine 410 may generate a monthly statement summarizing and/or itemizing downloads or streaming events by content source.

DRM server 114 may receive a request for DRM license from user device 170 for user-selected content. Upon receipt of the request, DRM server 114 may connect to platform account manager 126 and forward information provided in the request. The forwarded information may include a registration token. In some implementations, the information may also include location information of user device 170, an IP address of user device 170, or an ID of the base station via which user device 170 connects to or accesses network 190. The forwarded information may be used to verify that a. requesting user device 170 is entitled to receive the requested content before DRM server 114 issues a DRM license.

Depending on the implementation, either DRM server 114 or VCMS engine 410 may respond to a request from user device 170 to determine whether user device 170 is registered. Upon receipt of a client ID from user device 170, DRM server 114/VCMS engine 410 may determine whether user device 170 is registered, for example, by consulting platform account manager 126. If platform account manager 126 indicates that user device 170 is registered, DRM server 114/VCMS engine 410 may indicate to user device 170 that user device 170 has been registered. If platform account manager 126 indicates that user device 170 is not registered, DRM server 114/VCMS engine 410 may generate, via platform account manager 126 or on its own, an activation code (e.g., a 16 bit code) and an activation URI, identified based on the client ID. DRM server 114/VCMS engine 410 may forward the activation code to user device 170.

Content delivery system 112 may receive encrypted content from VCMS engine 410 and may provide the encrypted content to requesting user devices 170.

FIG. 5 is a diagram of exemplary functional components of platform account manager 126. In one implementation, the functions described in connection with FIG. 5 may be performed by one or more components of device 200 (FIG. 2). As shown in FIG. 5, platform account manager 126 may include a device registration server 510, an entitlement rights manager 520, a device database 530, an entitlement database 540, preferences 550, a tracking counter database 560, location manager 570, and platform accounts 580. Depending on the implementation, account manager 126 may include additional, fewer, different, or a different arrangement of components than those illustrated in FIG. 5.

Device registration server 510 may register user device 170 when device registration server 510 receives, via VCMS 110, a request for device registration from video application 300 on user device 170. When device registration server 510 receives a registration request, which includes a client ID and an activation code, from user device 170, device registration server 510 validates the client ID and the activation code (e.g., looking up a table (not shown)). Upon successful validation, device registration server 510 creates a globally unique registration token for identifying user device 170, and associates the registration token with a user account of the user of user device 170. Device registration server 510 may store association in device database 530 (e.g., along with the activation code and the client ID).

In some implementations, device registration server 510 may receive a request, from user device 170 via VCMS 110, to determine whether user device 170 associated with a client ID is registered ("active"). In such implementations, device registration server 510 may determine whether the client ID is in device database 530 (or another database). If the matching ID is found in device database 530 (or another database), device registration server 510 may send a message to user device 170, indicating that user device 170 is already registered. If user device 170 has not been registered (e.g., there is no matching client ID in device database 530), device registration server 510 may generate an activation code and an activation URL and forward them to user device 170.

Entitlement rights manager 520 may receive a request, from DRM server 114, to verify that video application 300 on user device 170 is entitled to view/play selected digital content. In verifying the entitlement, entitlement rights manager 520 may consult entitlement database 540 and/or other components to: verify whether a registration token, which was issued by device registration server 510 during user device 170 registration, is valid; determine whether content streaming rights have been granted; determine whether, if selected content is blackout content, user device 170 is located outside of a corresponding blackout region; determine whether the viewing/playing, time for the content is within a blackout time; determine whether a particular video quality right has been granted to the user; determine whether the total number of concurrent viewing/playing sessions on user devices 170 associated with a user exceeds a maximum provided in the subscription package purchased by the user; and determine whether a total number of viewing sessions over a period of time for the user of user device 170 exceeds the maximum provided in the subscription package purchased by the user.

Depending on the implementation, in determining whether user device 170 is located outside of a blackout region, entitlement rights manager 520 may use the location information of user device 170, the base station ID, or the IP address of user device 170 provided by/via DRM server 114, if entitlement rights manager 520 is given a base station Ds or an IP address associated with user device 170 by .DRM server 114, entitlement rights manager 520 may pass, in a request to location manager 570, the base station IDs or the IP address. In response to the request, location manager 570 may obtain location information that identifies the location of user device 170 and provide the location information to entitlement rights manager 520.

Once entitlement rights manager 520 has/obtains location information for user device 170, entitlement rights manager 520 may determine whether the location identified by the location information is within a blackout region for the content. Entitlement rights manager 520 may identify the blackout region for the content from looking up one or more of: entitlement database 540, catalog information in data center 120, metadata for the content, user account information, subscription information, etc.

Entitlement rights manager 520 may also determine whether the viewing/playing time for the content is within a blackout time. In making the determination, entitlement rights manager 520 may obtain the current time from a system clock, the duration of the content, and/or the blackout time from looking up one or more of: entitlement database 540, catalog information in data center 120, metadata for the content, user account information, subscription information, etc. Entitlement rights manager 520 may conclude that the viewing/playing time for the content is within the blackout time when the current time is within the blackout time, Device database 530 may include a database of user devices 170 that have been registered. In some implementations, for each device that is registered, device database 530 may include a registration token, a client ID, an activation code, an activation URL, the type of device, etc.

Entitlement database 540 may include a database of users' entitlement rights. Entitlement rights manager 520 may use entitlement database 540 to enforce what content a user can view on which device. For example, if a user purchased a particular movie, the user may be able to view the movie only on certain user devices 170 (e.g., a television, a personal computer, and/or or registered mobile devices). Entitlement database 540 may identify/indicate, for example: content for which the user has a streaming right; video quality rights; blackout regions corresponding to the content; blackout times correspond to the content; a total number of allowed sessions for the user's subscription; the maximum allowed number of concurrent viewing sessions; type of content (e.g., movies, TV shows, games, etc.) which the user is entitled to play/view; different types of devices on which the user may view/play content; whether the user is allowed to download; etc. Entitlement database 540 may have been built/constructed from data obtained from other systems/devices, such as a catalog in data center 120, partner system 150, etc. In some implementations, some of the information described above as being included in entitlement database 540 may be included in other components/databases, such as platform accounts 580, catalogs, metadata for the selected content, etc.

Preferences 550 may include users' preferences that are associated with accessing, purchasing, and/or playing content. For example, preferences 550 may include indications what genre of content the user prefers (e.g., adventure, comedy, drama, horror, etc.); preferred ratings (e.g., PG, G, R, etc.), user's bookmarks, parental settings for the user, etc.

Tracking counter database 560 may include one or more tracking counters. Each tracking counter corresponds to a different user/user account. For a given user, a tracking counter may indicate which of the user's devices are currently engaged in sessions for receiving content from VCMS 110. In addition, a tracking counter may include the total number of sessions that the user has conducted (e.g., over a period of time (e.g., a month)).

Location manager 570 may receive, from another component (e.g., entitlement rights manager 520) a request to identify locations of user devices. In one implementation, location manager 570 may receive either an IP address of user device 170 or one or more IDs of base stations via which user device 170 is connected to network 100 or with which user device)70 is associated.

When location manager 570 receives an IP address and user device 170 is a stationary device, location ma ager 570 may obtain the location of user device 170 based on the IP address. For example, in-home devices can be identified by the WAN side IP address of a home router, whose geo-location information may be obtained as a house street address. Once the street address is known, location manager 570 may translate the street address into coordinates that the requesting component can use. When location manager 570 receives one or more base station IDs, location manager 570 may obtain the location of user device 170 based on either a table lookup or via further function calls, for example, to another component, to obtain the location of user device 170. If location manager 570 receives more than one base station ID, location manager 570 may triangulate the location of user device 170.

Platform accounts 580 may include one or more of platform account. Each platform account may include some of account information and/or user profile, described above with reference to platform account manager 126.

Figure 6A:
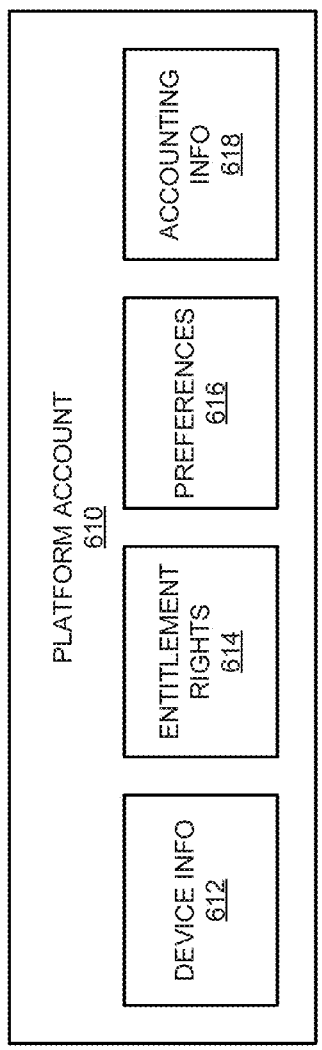
FIG. 6A is a block diagram of exemplary components of a platform account in the accounts of FIG. 5.

FIG. 6A is a block diagram exemplary components of a platform account 610 in platform accounts 580. According to one implementation, platform account 610 may include, for a given user, some of the information provided in device database 530, entitlement database 540, preferences 550, an/or another database, As shown, platform account 610 may include device information 612, entitlement rights 614, preferences 616, and accounting information 618 for the user. Depending on the implementation, platform account 610 may include additional, fewer, different, or differently arranged components than those illustrated in FIG. 6A.

Device information 612 may include a list/table of user devices 170 of a user and. information corresponding to each of the user devices 170. The list of user devices 170 may identify, for example, televisions that are connected to system 130, digital video disc and Blu-ray players, game consoles (Xbox™, Wii™, Playstation™, etc,), smart phones and tablet computers (e.g., iOS™, Android™, etc.). Device information 612 may indicate which of the user devices 170 are registered with system 130.

Entitlement rights 614 may identify/indicate entitlement rights pertaining to the user. Entitlement rights 614 may indicate the types of content to which the user is entitled to view/play, such as movies, TV shows, games, monthly subscription-based content, purchased. content, rented content, etc. Entitlement rights 614 may also indicate what types of access the user is granted. For example, entitlement rights 614 may indicate that the user is granted a download right, streaming right, high definition (HD)/standard definition (SD) quality access, the maximum number of concurrent device streaming access, the total number of sessions for a given subscription package, etc.

Preferences 616 may indicate user's preferences regarding genre of content (e.g., drama, comedy, adventure, etc.), ratings (e.g., PG, etc.), etc. In addition, preferences 616 may indicate bookmarks (e.g., user's favorite content sites), settings for parental controls, etc.

Accounting information 618 may include user's viewing history, purchase/rental history, and/or other access information.

Figure 6B:
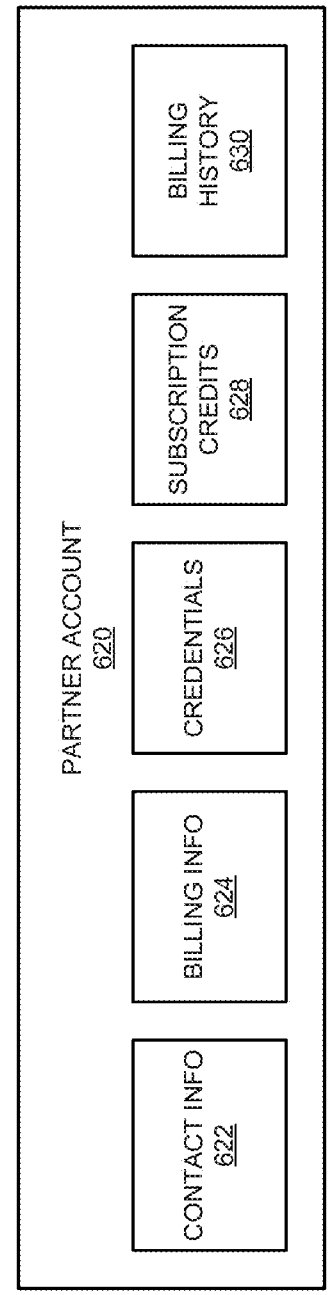
FIG. 6B is a block diagram of exemplary components of a partner account in the accounts of FIG.

FIG. 6B is a block diagram of exemplary components of a partner account 620 in partner accounts 154 of partner system 150. As shown, partner account 620 may include, for a given user, contact information 622, billing information 624, credentials 628, subscription credits, 628, and billing history 630. Depending on the implementation, partner account 620 may include additional, fewer, different, or different arrangement of components than those illustrated in FIG. 6B.

Contact information 622 may include the user's name, address, home/work/mobile phone number, email addresses, etc. Billing information 624 may indicate user's payment method (e.g., credit card, checking account. PayPal™, etc.), billing address, billing phone number, etc.

Credentials 626 may include a user's password, user ID, etc., for authenticating the user.

Subscription credits 628 may indicate the current credits associated with the user. In some implementations, subscription credits 628 may indicate the number of free downloads the user is entitled to, free DVD rentals, etc. In other implementations, subscription credits 628 may indicate the number of credit units. An amount of credit units may be deducted from subscription credit 628 when the user engages in an activity that "spends" the credits (e.g., download a movie, stream a pay-per-view sporting event, etc.). Billing history 630 may indicate a history of user's payments.

In system 130, user device 170 has to be registered with system 130 before user device 170 can request a license key for decrypting user-requested content. During the registration, the user credentials are verified via federated/cooperative authentication. Once registered, at the registered user device 170, the user may select and request particular content and a license key.

Figure 7:
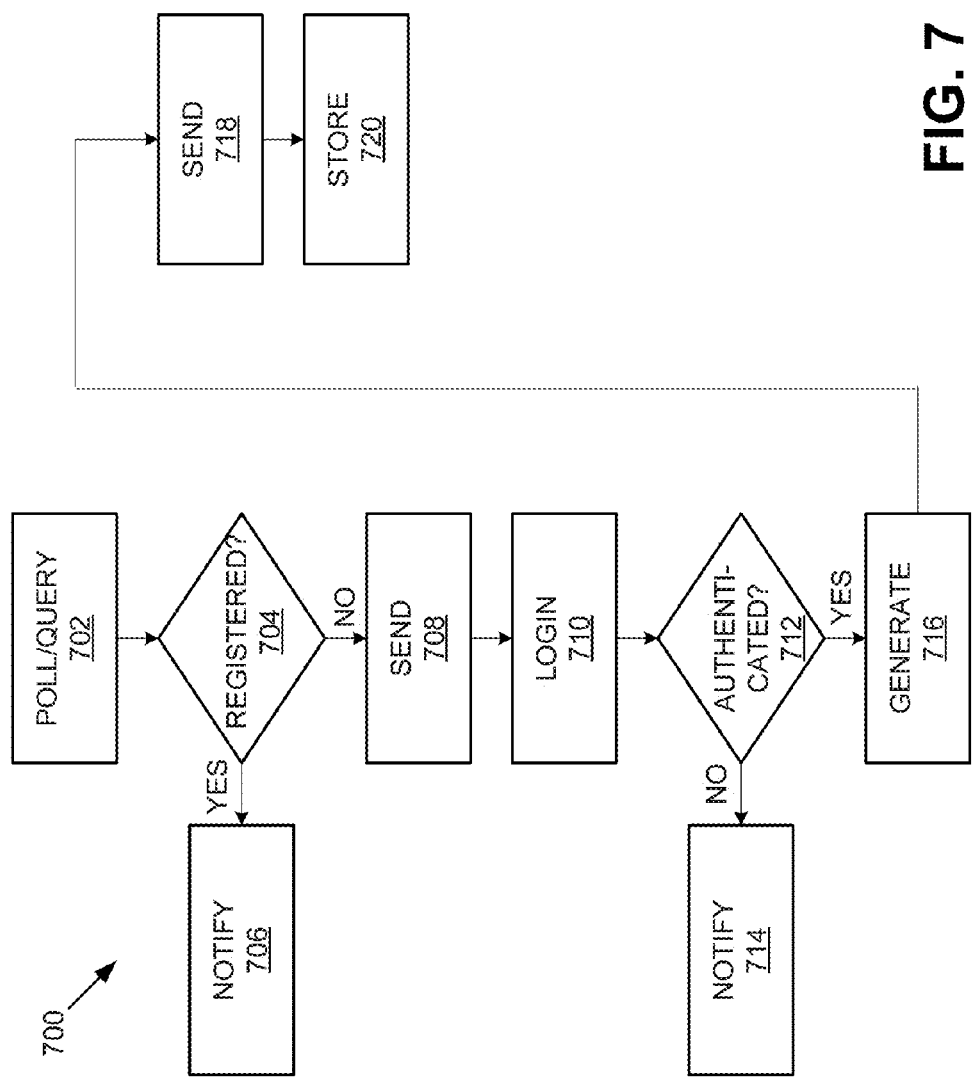
FIG. 7 is a flow diagram of an exemplary process that is associated with registering the user device of FIG. 1.

FIG. 7 is a flow diagram of an exemplary process 700 that is associated with registering user device 170. Process 700 is described below with reference to FIG. 8, which shows a flow of messages between video application 300 of user device 170 and device registration server 510. Assume that video application 300 is installed on user device 170.

Figure 8:
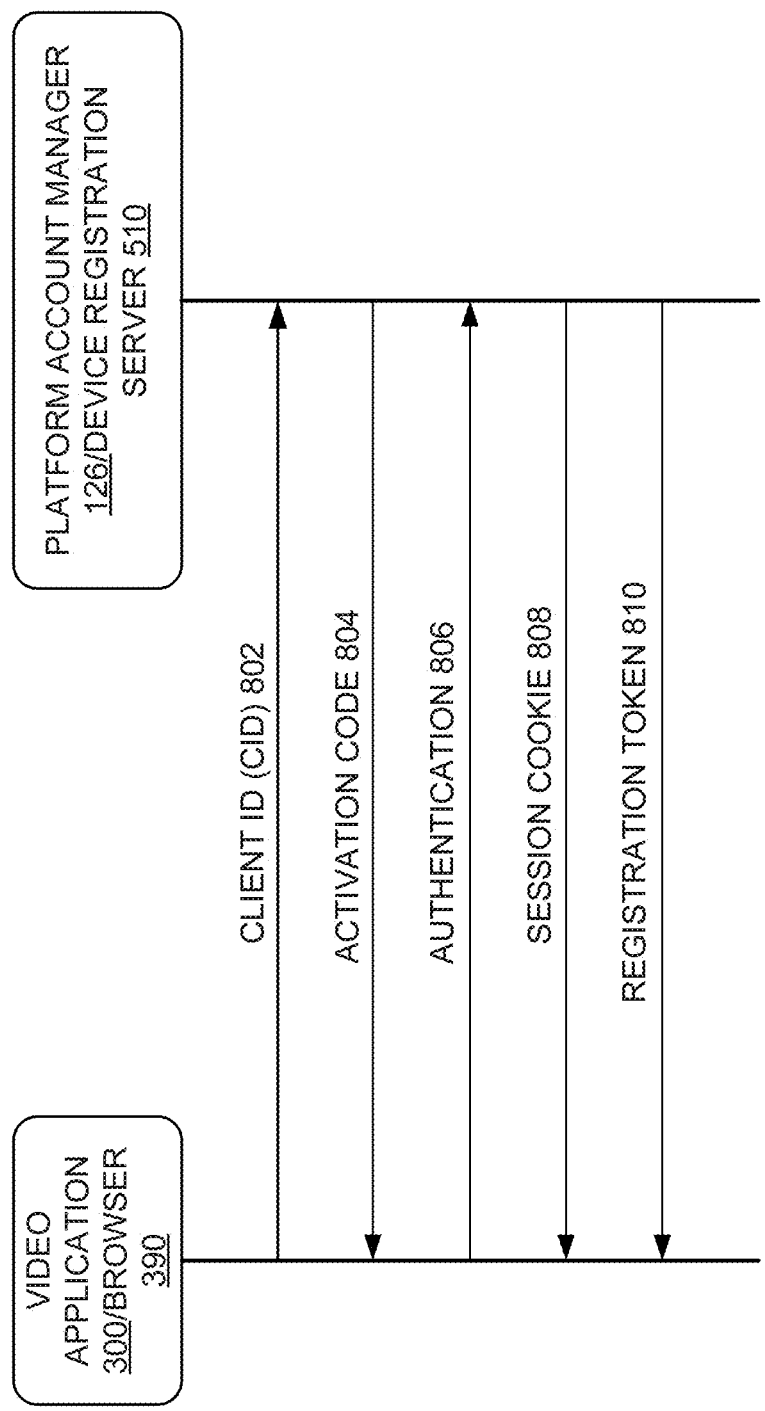
FIG. 8 is a diagram illustrating the flow of messages between the video application of FIG. 3 or a browser and the platform account manager of FIG. 1 or device registration server of FIG. 5.

Process 700 includes video application 300 polling or querying device registration server 510 (via VCMS 110) (block 702). As shown in FIG. 8, the polling or querying device registration server 510 may entail sending a message that includes a client ID 802 to device registration server 510 via VCMS 110, Upon receipt of the message, device registration server 510 may determine whether user device 170 is registered (block 704). In some implementations, device registration server 510 may examine information associated with the client ID (provided in the poll/query) in device database 530, for example.

If the information indicates that user device 170 is registered (block 704: yes), device registration server 510 may notify user device 170 that user device 170 is registered/active (block 706). If the information indicates that user device 170 is not registered (block 704: no), device registration server 510 or DRM server 114 may generate an activation code and an activation URL and send the code 804 and the URL to user device 170 (block 708). Upon receipt of the activation code and the activation URL from device registration server 510, user device 170 may display the code and the URL to the user. The user may open browser 390, and visit the URL.

Account manager 126 may receive, from the user at user device 170, a request for login Or authentication 806 (block 710) via browser 390. Account manager 126 may perform a federated authentication process with one or more partner systems 150. A process associated with the federated authentication is described below with reference to FIGS. 11 and 12. If the authentication is not successful (block 712: no), account manager 126 may notify user device 170 of the authentication failure (e.g., via application server 124) (block 714).

Otherwise (block 712: yes), account manager 125 sends a session cookie 808 to user device 170. Given the session cookie, the browser may establish a session with a component in system 130 (e.g., device registration server 510). During the session, device registration server 510 may receive, via application server 124, the activation code (input by the user at user device 170) and the client ID. Device registration server 510 may then validate the activation code and the client ID; generate a globally unique registration token; and associate the registration token with the user account (block 716). Device registration server 510 may send the globally unique registration token 810 to user device 170 (e.g., via application server 124) (block 718). Furthermore, device registration server 510 may store the registration information (e.g., the registration token, the client ID, the activation code, the association between the token and the user account, etc) in device database 530 (block 720). User device 170 may store the registration token in its local storage.

In some implementations, two different user devices 170 may be involved in performance of process 700, In such implementations, for example, one user device (e.g. user device 170-2) may obtain an activation code and an activation URL, and another user device (e.g., user device 170-1) with a browser may be used to login to system 112 and register the device (e.g., user device 170-2) for which the activation code and the URL were obtained.

Figure 9:
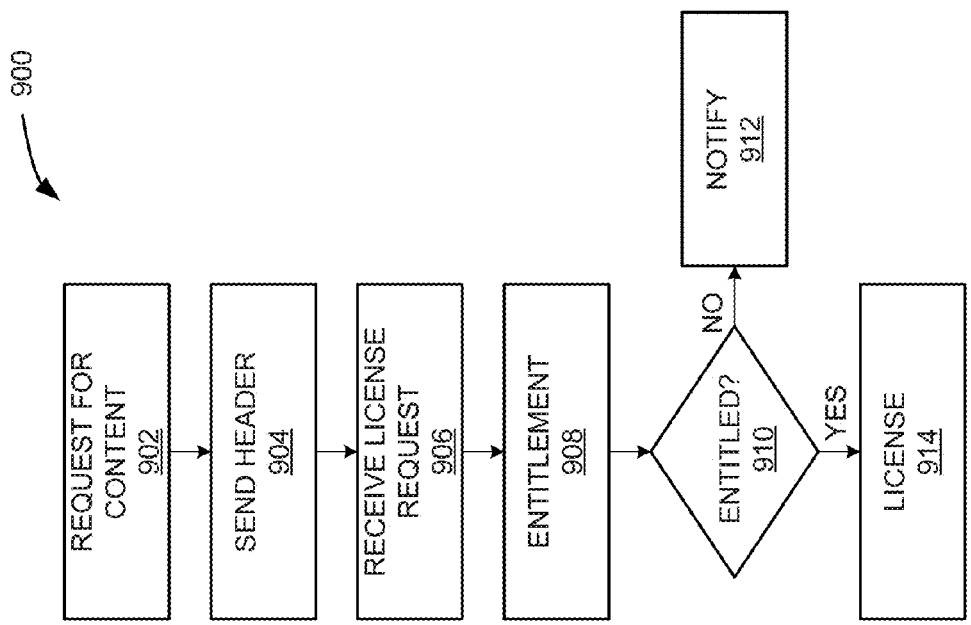
FIG. 9 is a flow diagram of an exemplary process for obtaining a license key for user requested content.

Once user device 170 is registered, the user may request/stream particular content and a license key corresponding to the content. FIG. 9 is a flow diagram of an exemplary process 900 for obtaining a license key for user-requested content. After a registration of user device 170, user device 170 may request user-selected content and a license key from VCMS 110 in accordance with process 900.

Figure 10:
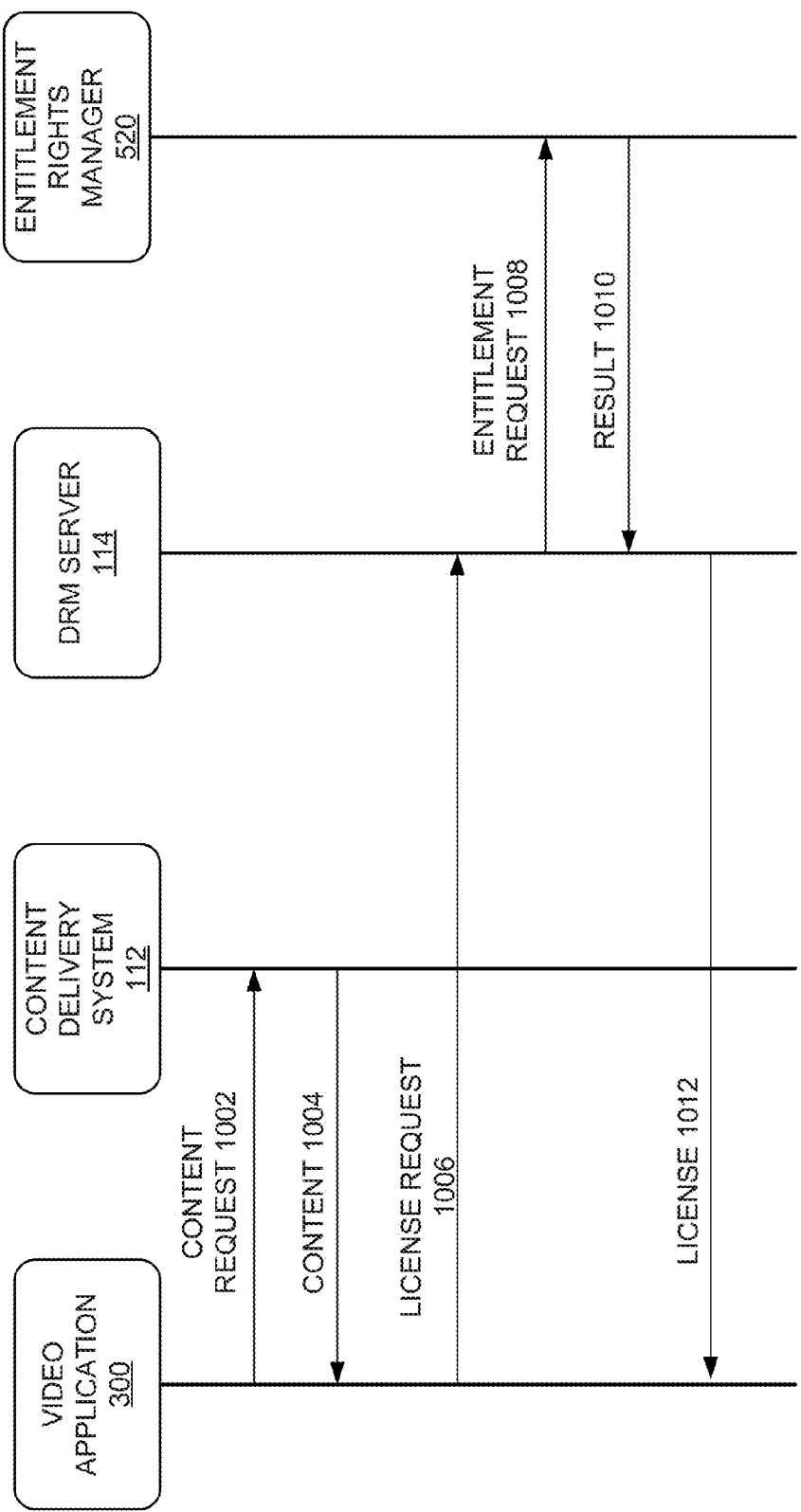
FIG. 10 is a diagram illustrating the flow of messages between the video application of FIG. 3, the content delivery system of FIG. 1, the digital rights management (DRM) server of FIG. 1, and the entitlement rights manager of FIG. 5.

Process 900 is described below with reference to FIG. 10, which shows a. flow of messages between video application 300 of user device 170, content delivery system 112, DRM server 114, and entitlement rights manager 520 of account manager 126. Assume that video application 300 is installed on user device 170, and that user device 170 has been registered at system 130 via device registration server 510.

Process 900 may include video application 300 in user device 170 sending a request 1002 for user selected content to VCMS 110 (block 902), When content delivery system 112 of VCMS 110 receives the request, content delivery system 112 may begin to stream/upload content 1004 to use. device 170, including a header associated with the content (block 904). The content may be encrypted, and video application 300 may be unable to play/view the content. without a license or a decryption key.

When the header associated with the content is downloaded to video application 300, video application 300 may issue, to DRM server 114 in VCMS 110, a request for license/decryption key 1006 (block 906). Upon receipt of the request, DRM server 114 may request 1008 entitlement rights manager 520 to determine whether user device 170 is entitled to play/view the content. Request 1008 may include information provided in the license request from user device 170. If request 1008 does not include location data, DRM server 114 may obtain location information from other components in system 130/network 100, and pass the location information (e.g., base station ID) to entitlement rights manager 520.

In response, entitlement rights manager 520 may consult entitlement database 540 and/or location manager 570 to verify whether the user is entitled (block 908), and return the result 1010 of the verification to DRM server 114. A process that is associated with verifying the entitlement is described below with reference to FIG. 13.

If user device 170 is not entitled to play the content (block 910: no), DRM server 114 may notify user device 170 that user device 170 may not view/play the content (block 912). If user device 170 is entitled to play the content (block 910: yes), DRM server 114 may generate/produce a license key and/or decryption key. DRM server 114 may send the license key/decryption key 1012 to user device 170 (block 9)4). Video application 300 may store the license key/decryption key as license data 370 and use the license key/decryption key to decrypt the content. Video application 300 may play the decrypted content via output devices 250 (e.g., display, speakers, etc.).

Figure 11:
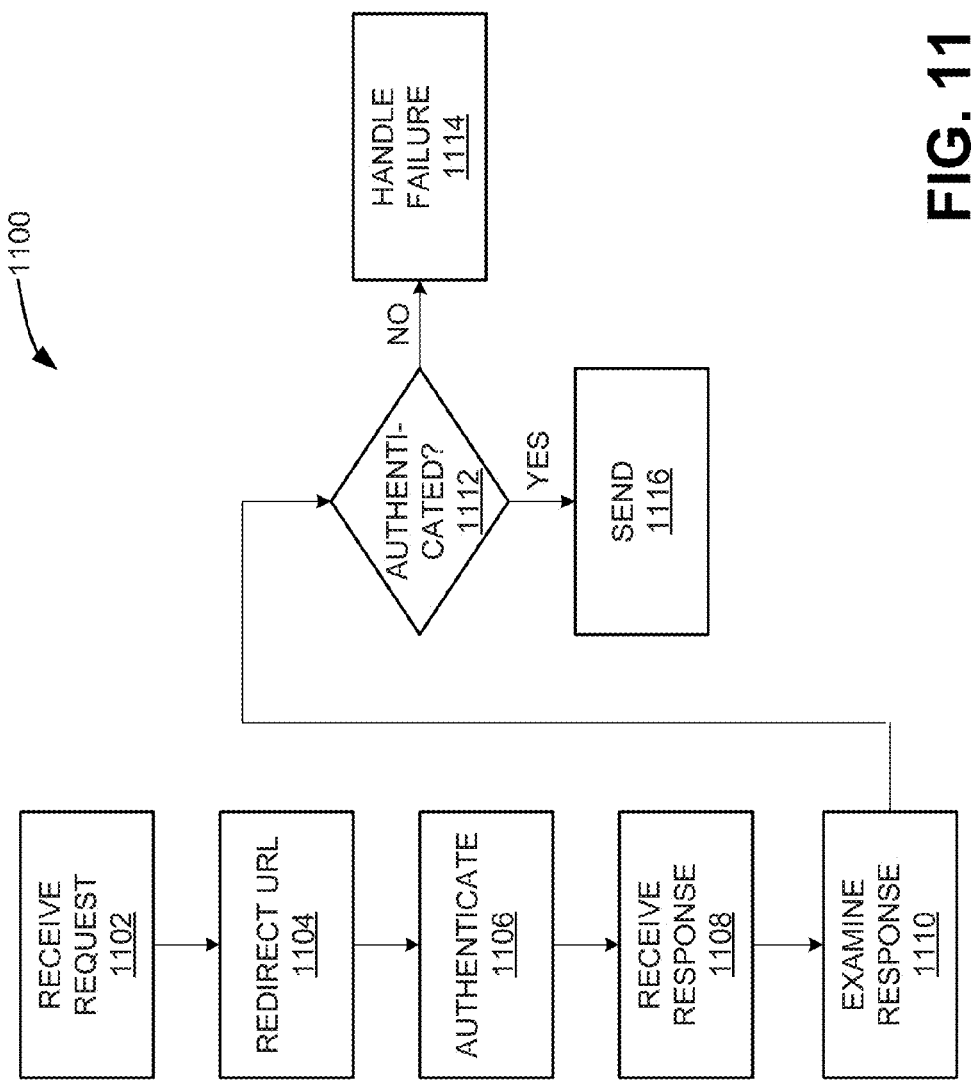
FIG. 11 is a flow diagram of an exemplary process for federated/collaborative authentication.
Figure 12:
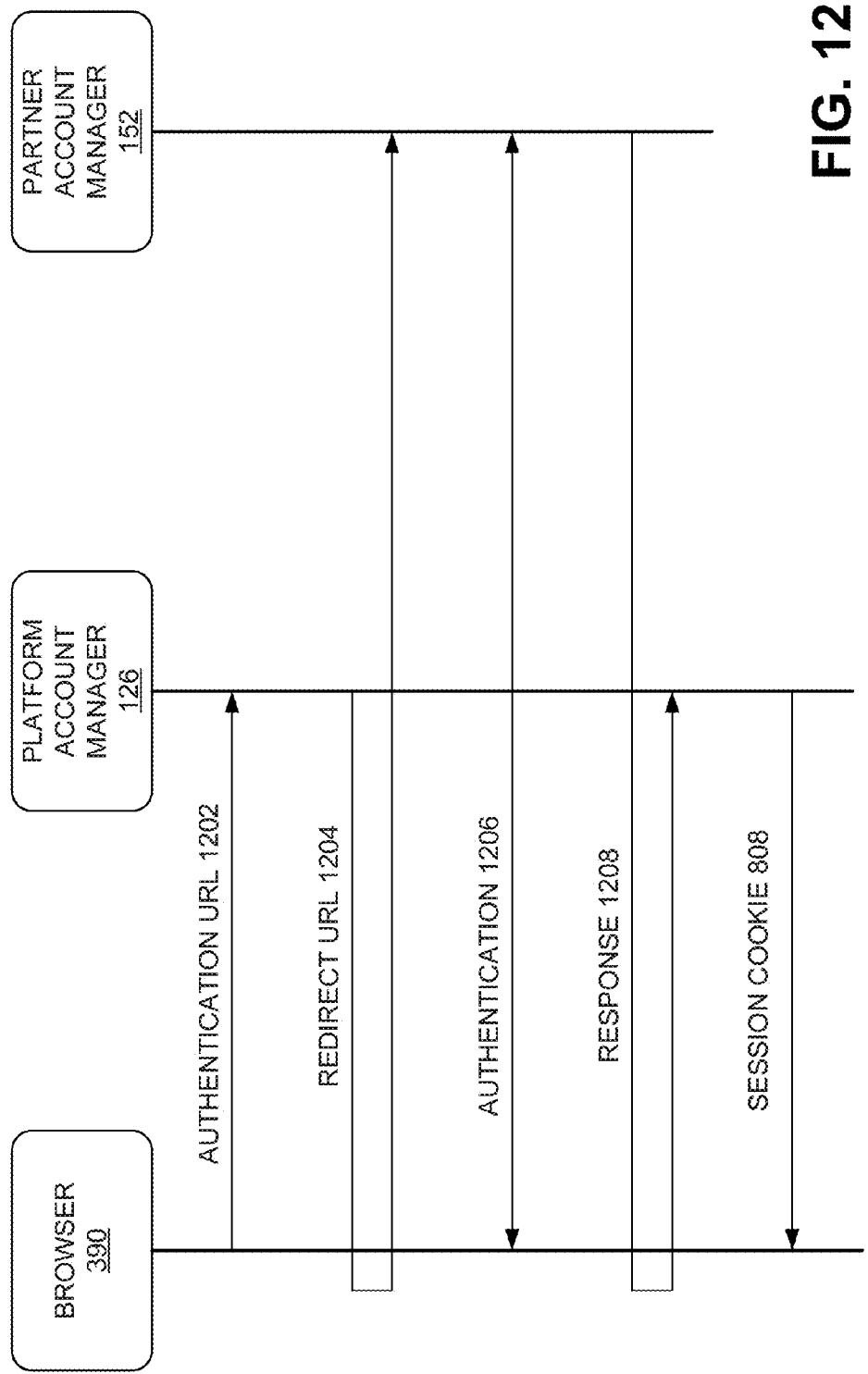
FIG. 12 is a diagram illustrating flow of messages between the browser of FIG. 3, the platform account manager of FIG. 1, and the partner account manager of FIGS. 1.

FIG. 11 is a flow diagram of an exemplary process 1100 for federated authentication. Process 1100 is associated with block 710 of process 700. Process 1100 is described below with reference to FIG. 12. FIG. 12 is a diagram illustrating the flow of messages between browser 390, platform account manager 126, and partner account manager 152. Assume that video application 300 is installed on user device 170, and that user device 170 is not yet registered at system 130.

Process 1100 may include platform account manager 126 receiving a request for authentication 1202 at an activation URL (block 1102). When platform account manager 126 receives the request, platform account manager 126 issues a redirect URL 1204 to browser 390 (block 1104). The redirect URL 1204 may include a request to partner account manager 152 for authentication (e.g., as a Security Assertion Markup Language (SAML 2.0) request). As a consequence of the redirect URL, browser 390 may attempt to authenticate 1206 via the redirect URL (block 1106). During the authentication, the user my provide credentials e u a user ID and a password) to partner account manager 152 via browser 390.

Partner account manager 152 may validate the credentials and return a response (e.g., SAML response in extensible hypertext markup language (XHTML) form). In one implementation., the response may include an SAML response that is base-65 encoded and. placed in a hidden input of an XHTML form. The SAML response may include a partner account number (PCN) that is encrypted with a public key associated with account manager 126 or VCMS 110.

Browser 390 may receive the response (block 1108). When browser receives the response, browser 390 may submit the response (e.g., post the XHTML form) to platform account manager 126 (e.g., through an offload event).

Platform account manager 126 may examine the response (block 1110). For example, in one implementation, when platform account manager 126 receives the response, platform account manager 126 may decrypt the PCN in the SAML message with account. manager 126's or VCMS 110's private key. If the decryption indicates that the authentication at partner system 150 (e.g., partner account manager 152) has not been successful (block 1112: no), platform account manager 126 may provide for the authentication failure (block 1114). For example, the decrypted PCN may be absent. In such an instance, platform account manager 126 may send a message to browser 390, indicating the authentication failure; and redirecting browser 390 to the activation URL; etc.

If the decryption indicates that the authentication at partner system 150 has been successful (e.g., the decrypted PCN exists) (block 1112: yes), platform account manager 126 may create a session (for completing the registration, create a federated account, and link the account with the session. Furthermore, platform account manager 126 may create a session cookie, and send the session cookie in a response to browser 390 (block 1116).

Figure 13:
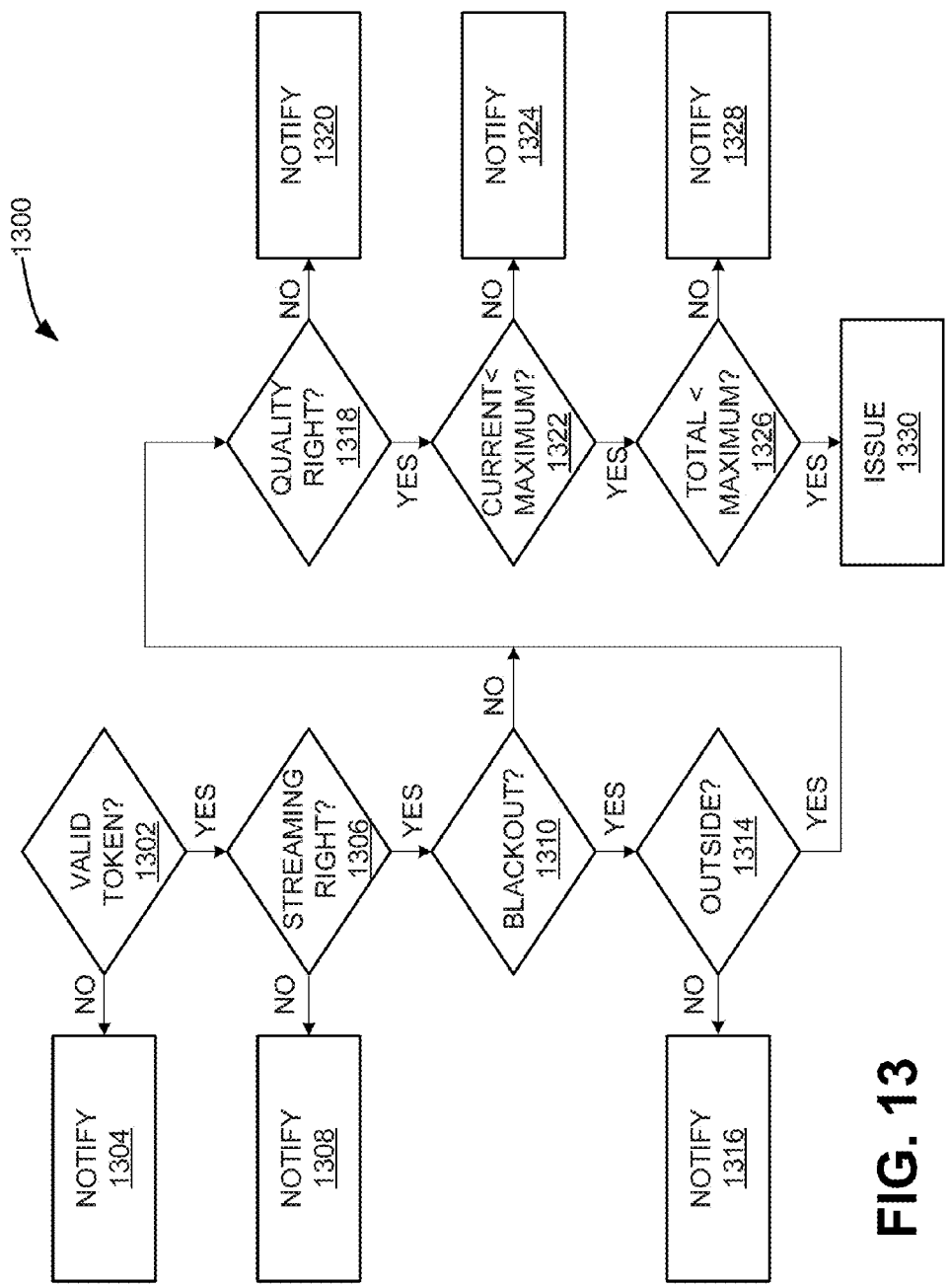
FIG. 13 is a flow diagram of an exemplary process that is associated with validating entitlement.

FIG. 13 is a flow diagram of an exemplary process 1300 that is associated with validating entitlement. Process 1300 is also associated with block 908 of process 900. As shown, process 1300 may include determining whether a. registration token provided by user device 170 via DRM server 114 to entitlement rights manager 520 is valid (block 1302). For example, entitlement rights manager 520 may request device registration server 510 in account manager 126 to provide a registration token stored in device database 530 or platform accounts 580. Furthermore, entitlements rights manager 520 may compare the registration token provided by user device 1170 to the registration token provided by device registration server 510.

If the registration token from user device 170 is not valid (e.g., the registration token from user device 170 does not match the token provided by device registration server 510) (block (304: no), entitlement rights manager 520 may notify DRM server 114 that user device 170 is not entitled to the content (block 1304). Otherwise (block 1302: yes), entitlement rights manager 520 may proceed to block 1306.

At each of blocks 1306, 1310, 1314, 1318, 1322, and 1326, entitlement rights manager 520 may consult device database 530, entitlement database 540, a content catalog (not shown), tracking counter database 560, location manager 570, platform accounts 580, and/or partner accounts 154 to determine whether user device 170 or the user of user device 170 satisfies conditions(s) for a particular entitlement. In addition, entitlement rights manager 52 may use the information provided by DRM server 114, including location information.

At block 1306, entitlement rights manager 520 may determine whether user device 170 has a streaming right for the selected content (block 1306). If entitlement database 540 or platform accounts 580 indicates that the user/user device 170 does not have a streaming right (block (306: no), entitlement rights manager 520 may notify DRM server 114 that the user/user device 170 lacks the entitlement right (block 1308). Otherwise (block 1306: yes), process 1300 may proceed to block 1310.

Entitlement rights manager 520 may determine whether the selected content is blackout content (content that is prohibited from being distributed or played in a blackout region(s) or during a blackout time(s)) (block 1310). In determining whether the selected content is blackout content, depending on the implementation, entitlement right manager 520 may inspect information received from user device 170 via DRM server 114 and/or examine the following databases/data source for an indication of whether the content is blackout content: a catalog of content; entitlement database 540; platform accounts 580; partner accounts 154; etc.

If the content is not blackout content (block 1310: no), entitlement rights manager 520 may proceed to block 1318. If the content is blackout content (block 1310: yes), entitlement rights manager 520 may determine whether user device 170 is outside of a blackout region (e.g., a region in which the content is to be blacked out) (block 1314) and/or blackout time.

In determining whether user device 170 is outside the blackout region, entitlement rights manager 520 may use information, provided by DRM server 114. If the information does not directly identify the location of user device 170 (e.g., the information is the IP address of user device or provides base station ID(s)), entitlement rights manager 170 may pass the information to location manager 570, to identify the location of user device 170.

If user device 170 is not outside of the blackout region (block 1314: no) or not outside of blackout time (e.g., the current time is in a blackout time(s)), entitlement rights manager 520 may notify DRM server 114 that user device 170 is not titled to play the content (block 1316). Otherwise (block 1314: yes), process 1300 may proceed to block 1318.

Entitlement rights manager 520 may determine whether user device 170 is entitled to play the content at a particular quality (e.g., high definition) (block 1318). The quality may depend on the package to which the user of user device 170 is subscribed. If user device 170 is not entitled to play the content at the particular quality (block 1318: no), entitlement rights manager 520 may notify DRM server 114 that the user device 170 is not entitled to play the content (block 1320). Otherwise (block 1318: yes), entitlement rights manager 520 may proceed to block 1322.

Entitlement rights manager 520 may determine whether he number of concurrent viewings is less than the maximum number of current viewings specified in the subscription package to which the user of user device 170 is subscribed (block 1322). Entitlement rights manager 520 may determine the number of concurrent viewings by examining tracking counter database 560 and counting the number of user devices 170 (that belong to the user) whose flags are "on." In addition, depending on the implementation, entitlement rights manager 520 may determine the maximum number of allowable concurrent viewings by looking up a database device database 530, entitlement database 540, preferences 550, platform accounts 580, partner accounts 154, or another database in partner system 150).

If the number of concurrent \Timings is not less than the maximum (block 1322: no), entitlement rights manager 520 may notify DRM server 114 that user device 170 is not entitled to play the content (block 1324), Otherwise (block 1322: yes), entitlement rights manager 520 may proceed to block 1326.

Entitlement rights manager 520 may determine whether the total number of viewings is greater than the maximum number of total viewing allowed under the users subscription package (block 1326). Entitlement rights manager 520 may obtain the total number of viewings by looking up, inside tracking counter database 560, a tracking counter corresponding to user device 170. In addition, depending on the implementation, entitlement rights manager 520 may obtain the maximum total number of allowed viewings that is allowed under the user's subscription package (e.g., over a period of time) by looking up the information in a database (e.g., device database 530, entitlement database 540, preferences 550, partner accounts 154, platform accounts 580, or another databases in partner system 150).

If the total number of viewings for the user is not less than the maximum (block 1326: no), entitlement rights manager 520 may notify :DRM 114 that user device 170 is not entitled to play the content (block 1328). If the total number of viewings is less than the maximum (block 1326: yes), entitlement rights manager 520 may issue a notification to DRM server 114, indicating that user device 170 has the entitlement right to play the content (block 1330).

As described above, system 130 performs a federated or collaborative authentication. Before a user can receive content from system 130 via user device 170, the user needs to register user device 170. When a user registers user device 170 at system 130 via browser 390 installed on user device 170, platform account manager 126 initiates a federated authentication by redirecting browser 390 to partner system 150. Partner system 150 then authenticates the user, and redirects browser 390 to platform account manager 126, sending a message to account manager 126 to indicate a result of the authentication, Platform account manager 126 completes the federated authentication by verifying the message. If the message is successfully verified, platform account manager 126 allows the user to proceed with the registration. Once user device 170 is registered, the user may request user-selected content from system 130 to be streamed to registered user device 170.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, while series of blocks have been described with respect to FIGS. 7, 9, 11, and 13, the order of the blocks may be modified in other implementations. Further, non-dependent blocks may be performed in parallel.

It will be apparent that different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware can be designed to implement these aspects based on the description herein, Further, certain portions of the invention may be implemented as a "component" or "system" that performs one or more functions. These components/systems may include hardware, such as a processor, an AS IC, or a FPGA, or a combination of hardware and software.

No element, act, or instruction used in the present application should be construed as critical or essential to the invention unless explicitly described as such. Also, as used herein, the article "a" and "one of" is intended to include one or more items. Further, the phrase "based on" is intended to mean "based, at least in part, on" unless explicitly stated otherwise.

What is claimed is:

1. A method comprising:
    receiving, at a site, a first message for federated authentication from a browser hosted on a user device;
    sending, from the site, a redirect universal resource locator of a partner system to the browser;
    receiving a response from the partner system via the browser, the response including a second message that includes an encrypted partner account number (PCN) associated with the partner system that indicates whether an authentication of a user of a first device, at the partner system, was successful;
    decrypting the PCN;
    determining, based on the decrypted PCN, whether the authentication was successful; and
    registering the first device when it is determined that the authentication was successful.

2. The method of claim 1, wherein the registering the first device includes:
    receiving, from the user device, an activation code that identifies the first device; and
    issuing a registration token to the user device when it is determined that the authentication was successful based on the second message.

3. The method of claim 2, further comprising:
    receiving, from the first device, a request for a license key for particular content;
    determining whether the first device is registered;
    determining whether the user is entitled to play the particular content at the first device; and
    issuing the license key to the first device when it is determined that the user is entitled to play the particular content at the first device.

4. The method of claim 3, wherein the first device is the user device.

5. The method of claim 3, wherein determining whether the first device is entitled to play the particular content includes:
    determining whether a total number of sessions associated with the user exceeds a predetermined number;
    determining whether the user has a right to have the content streamed to the first device;
    determining whether the first device is within a blackout region associated with the particular content; or
    determining whether the user has a right to play the content, at the first device, at a particular quality level.

6. The method of claim 1, further comprising:
    receiving a client application identifier from the first device;
    validating the client application identifier; and
    sending an activation code and the universal resource locator to the first device if the client application identifier is valid.

7. The method of claim 1, wherein sending the redirect universal resource locator includes:
    sending a Security Assertion Markup Language (SAML) request.

8. The method of claim 1, wherein receiving the response includes:
    receiving an extensible hypertext markup language (XHTML) message.

9. The method of claim 8, wherein the XHTML message includes:
  a Security Assertion Markup Language (SAML) response.

10. The method of claim 9, wherein the SAML response includes the PCN.

11. The method of claim 10, wherein determining whether the authentication was successful includes:
  decrypting the encrypted PCN via a private key associated with the partner system; and
  comparing the decrypted PCN to a PCN of the partner system.

12. One or more devices comprising:
  one or more network interfaces to:
    communicate, over a network, with a user device that is associated with a user;
  one or more memories that store instructions to be executed by one or more processors; and
  the one or more processors configured to execute the instructions to:
    receive, at a site, via the one or more network interfaces, a first message for authentication from a browser hosted on the user device;
    send, from the site via the one or more network interfaces, a redirect universal resource locator (URL) to a partner system, to the browser;
    receive a response from the partner system via the browser and the one or more network interfaces, the response including a second message that includes an encrypted partner account number (PCN) associated with the partner system that indicates whether an authentication of the user of the user device at the partner system, was successful;
    decrypt the PCN;
    determine, based on the decrypted PCN, whether the authentication was successful; and
    register the user device when the one or more processors determine that the authentication was successful.

13. The one or more devices of claim 12, wherein when the one or more processors register the user device, the one or more processors are further configured to execute the instructions to:
  receive, from the user device, an activation code that identifies the user device;
  issue a registration token to the user device when it is determined that the authentication was successful based on the second message; and
  store the registration token in the user device.

14. The one or more devices of claim 13, wherein the one or more devices are further configured to:
  receive a request for a license key for particular content from the user device via the one or more network interfaces;
  determine whether the user device is registered based on the request;
  determine whether the user is entitled to play the particular content at the user device; and
  issue the license key to the user device when the one or more processors determine that the user is entitled to play the particular content at the user device.

15. The one or more devices of claim 14, wherein when the one or more processors determine whether the user device is entitled to play the particular content, the one or more processors are further configured to execute the instructions to at least one of:

determine whether a total number of sessions associated with the user exceeds a predetermined number;
  determine whether the user has a right to have the content streamed to the user device;
  determining whether the user device is within a blackout region associated with the particular content; or
  determine whether the user has a right to play the content, at the user device, at a particular quality level.

16. The one or more devices of claim 12, wherein the one or more processors are further configured to execute the instructions to:
  receive a client application identifier from the user device;
  validate the client application identifier; and
  send an activation code and the universal resource locator to the user device if the client application identifier is valid.

17. The one or more devices of claim 12, wherein the redirect URL includes:
  a Security Assertion Markup Language request for authentication by the partner system.

18. The one or more devices of claim 12, wherein the response includes:
  an extensible hypertext markup language (XHTML) message.

19. The one or more devices of claim 18, wherein the XHTML message includes:
  a Security Assertion Markup Language (SAML) response.

20. The one or more devices of claim 19, wherein the SAML response includes the PCN,
  wherein when the one or more processors determine whether the authentication was successful, the one or more processors are further configured to execute the instructions to:
    decrypt the encrypted PCN via a private key associated with the partner system; and
    compare the decrypted PCN to a PCN of the partner system.

21. A device comprising:
  a network interface to communicate with a remote system;
  a memory that stores instructions; and
  one or more processors configured to execute the instructions in the memory to:
    send, to a site, via the network interface, a first message for authentication;
    receive, from the site via the network interface, a redirect universal resource locator to a partner system;
    forward, to the remote system, a response from the partner system via the network interface, the response including a second message that includes an encrypted partner account number (PCN) associated with the partner system that indicates whether an authentication of a user of a first device, at the partner system, was successful;
    decrypt the PCN;
    send an activation code for the first device to the remote system that accepts the activation code when the remote system determines, based on the decrypted PCN, that the authentication of the user of the first device at the partner system was successful; and
    receive a registration token from the remote system via the network interface, wherein the remote system generates the registration token based on the activation code.

* * * * *